United States Patent Office.

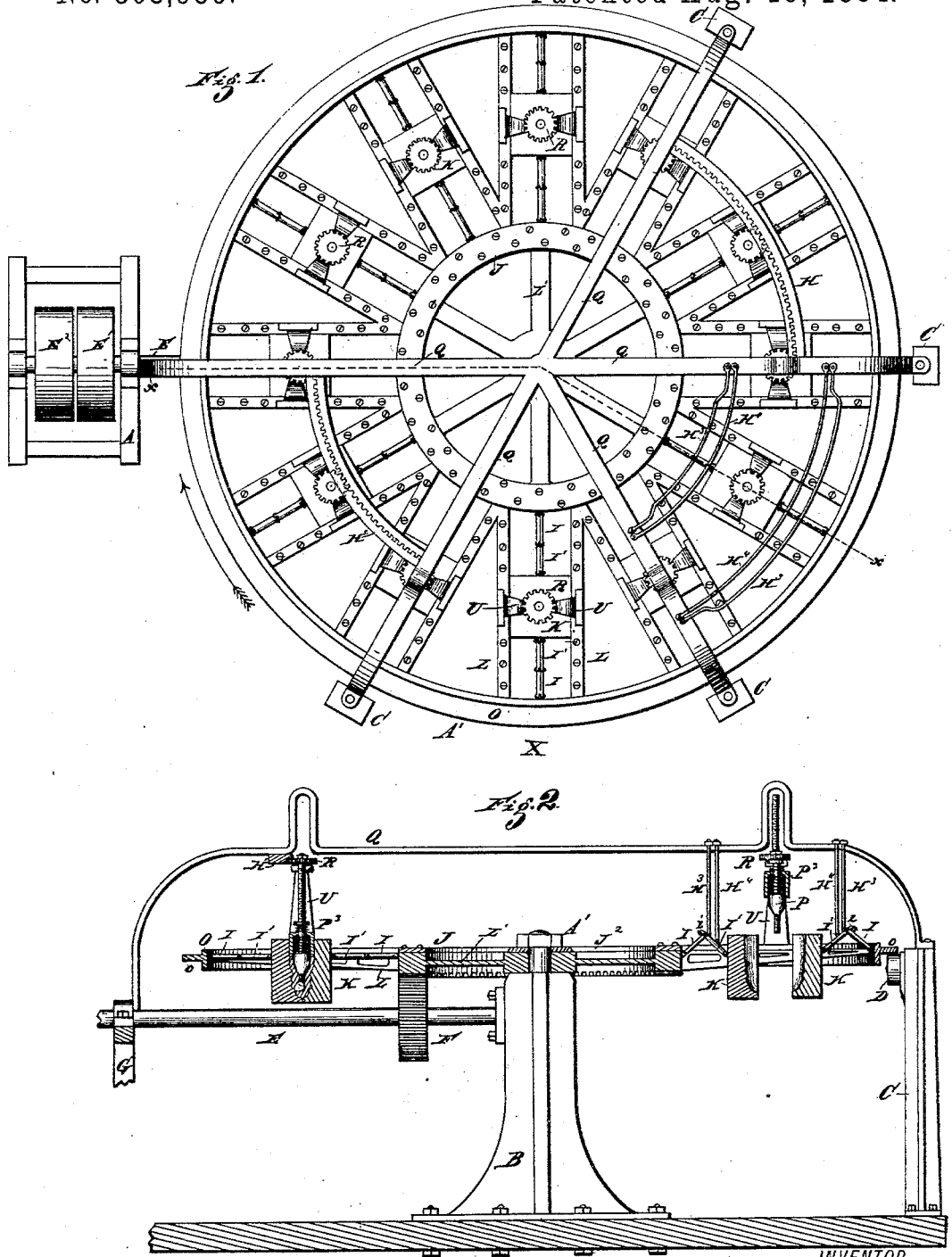

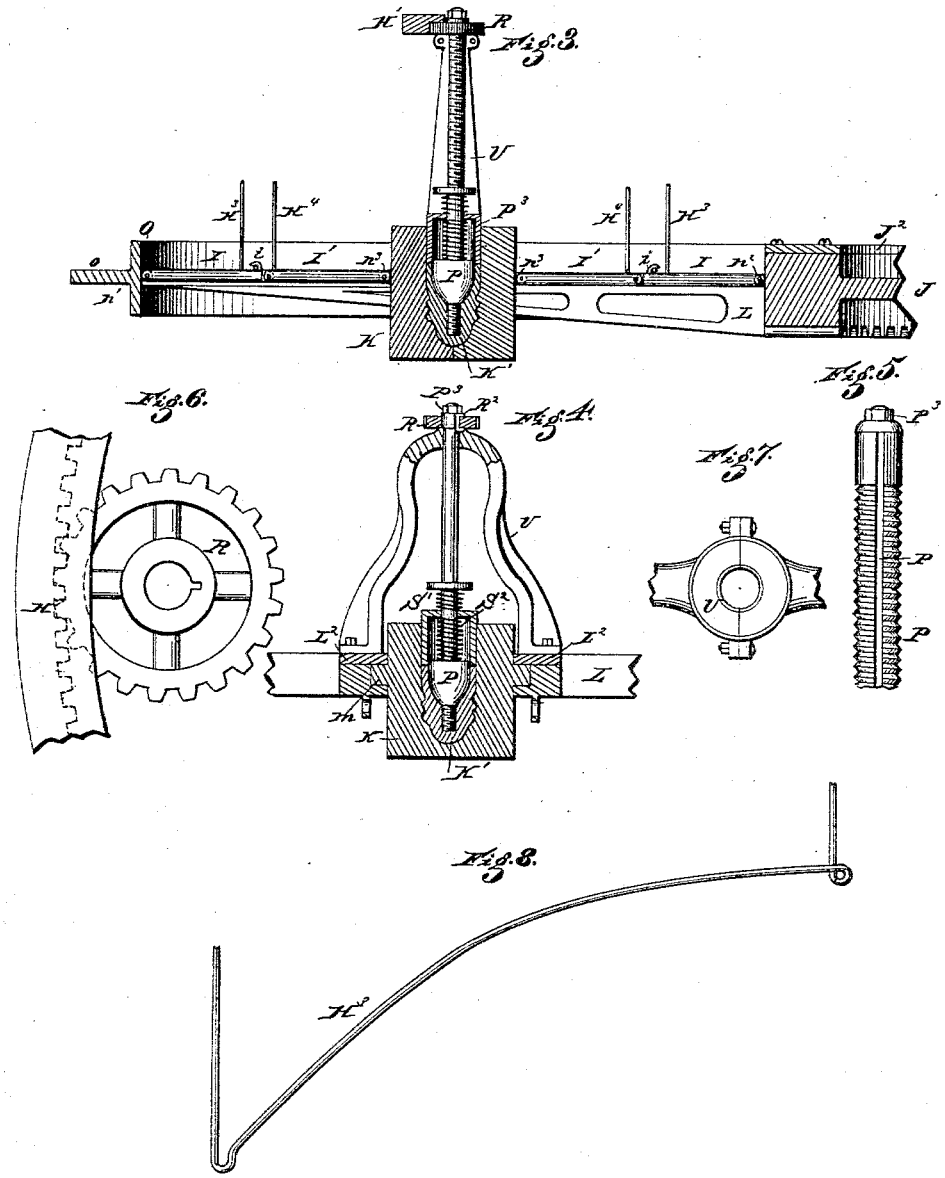

EMIL F. KRELL, OF DETROIT, MICHIGAN, ASSIGNOR OF THREE-FIFTHS TO ORVILLE W. OWEN, OF SAME PLACE.

MACHINE FOR MAKING GLASS INSULATORS.

SPECIFICATION forming part of Letters Patent No. 303,936, dated August 19, 1884.

Application filed March 24, 1884. (No model.)

*To all whom it may concern:*

Be it known that I, EMIL F. KRELL, of Detroit, county of Wayne, State of Michigan, have invented a new and useful Improvement in Machines for Making Glass Insulators; and I declare the following to be a full, clear, and exact description of the invention, such as will enable others skilled in the art to which it pertains to make and use it, reference being had to the accompanying drawings, which form a part of this specification.

My invention consists of the combination of devices and appliances hereinafter specified, and more particularly pointed out in the claims.

In the drawings, Figure 1 is a plan view of a device embodying my invention. Fig. 2 is a vertical section of the same, showing parts in elevation. Fig. 3 is a vertical section through one of the molds and adjacent mechanism, showing parts in elevation. Fig. 4 is a transverse section through the same, showing the slides in which the molds move and the bracket which supports the plunger. Fig. 5 is a separate view of the screw of the plunger. Fig. 6 is a separate view of one of the spur-gears with a portion of the segmental gear meshing therewith for operating the plunger. Fig. 7 is a separate view of the top of the bracket which supports the plunger. Fig. 8 is a separate view of one of the bars.

My invention relates to the improved machine for making glass insulators for telegraph, telephone, and electric-light wires, &c., and other articles of glass manufacture.

My invention contemplates improved means whereby the manufacture of said articles may be more rapidly and automatically accomplished after the molds are filled with glass by the operator; and it consists, essentially, first, of a series of molds with mechanism for operating the same; second, of a series of plungers with improved mechanism for operating the same; and, third, of improved means for manipulating said molds and plungers in due succession to accomplish the forcing of the plungers into the molds, then permitting the glass to properly cool, then to retract said plungers, after which the molds are opened, the insulators removed therefrom, and the molds closed again to receive the glass.

I carry out my invention as follows:

As illustrated in the drawings, A is any suitable supporting-frame.

B is any suitable supporting-post.

A' is a revolving frame adapted to rotate horizontally above the post B as its axis.

C represents a series of posts located at the periphery of the rotary frame A', and provided with suitable anti-friction wheels, D, to assist in bearing the weight of said frame and to provide for its satisfactory rotation.

E is a driving-shaft driven by any suitable device—as, for instance, by the pulleys E' and $E^2$. This driving-shaft E may be given a continuous or an intermittent rotary motion, as may be preferred.

F is a pinion upon said driving-shaft. Said shaft is provided with suitable bearings—as, for instance, upon the standard G and in the supporting post B.

J is a gear-wheel connected with the rotary frame A', meshing with the pinion F, whereby the frame A' is rotated. This gear-wheel is preferably cast separate, and then secured in position as a part of said rotary frame in any suitable manner, said frame consisting, essentially, of a rim, O, having suitable brackets or spokes, L, connecting said rim with the gear J, said gear provided with interior spokes, L'. These spokes L may be secured in place in any proper manner, and are arranged in a series of pairs, as illustrated in Fig. 1, the spokes of a single pair being preferably parallel with each other. The rim or tire O is preferably constructed with a flange, o, adapted to ride upon the anti-friction wheels D. I prefer to provide the gear-wheel J with an annular plate, $J^2$, bolted thereto, as shown in Fig. 3, whereby the spokes L may be more readily secured in place, removed, and replaced whenever desired. These spokes serve as slides for a series of molds, K, as more thoroughly illustrated in Fig. 4, said spokes being constructed to receive a flange, $m$, upon said molds, and to permit the reciprocation of the separate parts of the molds therein. This may be readily accomplished by constructing said brackets with a removable plate, $L^2$, to permit the removal of the molds whenever it is desired. The tire O is provided with a series of lugs, $n'$, preferably made adjustable therein. The gear-wheel J is preferably provided with a series of lugs, $n^2$, and the molds with lugs $n^3$. These lugs $n^2$ may also be made adjustable, if desired.

I and I' represent a series of toggle-levers connected with the lugs $n'$ and $n^3$ $n^3$ and $n^2$, respectively, by which the different parts of the molds are opened or closed, as desired. The object of making the lugs $n'$, $n^2$, and $n^3$ adjustable in their connections is that they may be lengthened, if desired, to take up any wear that may occur in the joints of the levers I and I', thereby always keeping them tight, so that the molds may be pressed together in a suitable manner.

P is a series of plungers of any suitable construction, screw-cut along their upper extremities, as shown in Figs. 3 and 4.

U is a bracket by which each of the plungers is supported, and through which they may be forced upward and downward.

K' represents the insulators or other articles.

$P^3$ is a cap located upon the lower end of the plunger and adapted to slide thereon, said plunger provided with a spring, S', above said cap, and also a spring, $S^2$, beneath the same, the construction being such that as the plunger is forced into the molds, the cap may be retracted, as desired, to give place for the glass, the spring S' throwing the cap downward into suitable position again when the plunger is removed from the mold.

The brackets U may be constructed and secured to the frame in any suitable manner. The plunger is also provided, preferably, with a slot or keyway, $p$, cut through and across the threads longitudinally.

$R^2$ is a key located therein, made to fit loosely, so that it will move up and down freely therein when the plunger is raised or lowered.

R is any suitable gear for operating the plungers. One of these gears is mounted upon each of the plungers in any suitable manner, and adapted to mesh with segmental gears H and H', the construction and arrangement being such that as the rotary frame A' travels around its axis it brings each of these gears in due succession into contact with said segmental gears, the gears R being revolved thereby, so as to force the plungers P into or out of the molds. I do not limit myself to any particular method of operating said plungers by said gears R, but, as illustrated in the drawings, the upper end of the plunger is provided with a cap, $P^3$, removably secured thereto, to allow the gears R to be easily removed and replaced, if desired. The ends of the key $R^2$ are also preferably made to lap over the gear R, as shown in Fig. 4, so as to keep in position with said gear.

Q represents an elevated stationary frame of suitable construction, being supported in any proper manner, as, for instance, at its extremities upon the posts C and G. To the arms of this elevated frame are secured the segmental gears H and H', adapted to rotate the gears R in opposite directions, so as to raise and lower the plungers P. I also prefer to construct the segmental gears with a flange cast upon their upper faces, so that when the gears R come in contact with the teeth of said segmental gears, the gears R will pass under the flange, and so be held in position between the bracket U and said flange while the frame is operated, thus forcing the plungers up and down through their gears R.

$H^3$ is a metallic bar bent so as to form an inclined plane, and which engages with the hooks $i$ upon one of the arms of the toggle-levers I as the rotary frame A' is revolved, thereby lifting said arms and spreading apart the two parts of the molds. $H^4$ are similar bars bent downward on an incline, and which serve to force the top of the levers back into position, and so close the molds. One of these bars for operating said toggle-levers may be dispensed with, if preferred, the other being so constructed as to perform both operations of opening and closing the molds.

Instead of employing the posts C, they may be dispensed with, if preferred, or the rollers D may be secured to any suitable supports or altogether omitted; but by their use they serve to support the outer rim of the revolving frame and keep it from rocking and vibrating as the plungers are lowered and raised and the molds are opened and closed; but I do not limit myself to their use. So, also, I contemplate as coming within the scope of my invention any suitable mechanical device for opening and closing the molds, and do not confine myself to the toggle-levers operated by the bars $H^3$ and $H^4$. So, moreover, the plungers may be forced into and out of the molds in various ways, and I would have it understood that I do not limit myself to the specific form of gear mechanism here shown and described for this purpose.

The operation of the device is as follows: The operator, standing in front of the revolving frame—say at X, Fig. 1—fills the molds in front of him with glass. The molds are then carried about in the direction of the arrow, and the gear R of the plunger engages with the segmental gear H', and is thereby forced into the mold, in which position it remains, while the glass sets, until said mold and plunger are adjacent to the end of the segmental gear $H^2$, when the gear R engages therewith in such a manner as to raise the plunger. This is accomplished by the time the gear has reached the bars $H^3$ and $H^4$, when, as the frame continues to revolve, the two parts of the mold are automatically opened, dropping the article, and are closed again by the time the mold has passed the said bars, and is again ready to be filled, all that is required of the operator being to fill each mold as it comes before him, the machine thus automatically forcing the plungers into and out of the molds, and also opening the same, depositing the article, when they are closed for use as above described.

While I prefer to employ a rotary frame bearing the molds, it is evident that the molds may be rotated about in front of the operator by other means—as, for instance, instead of the rotary frame, a fixed tramway might be employed, and the molds be rotated by suitable chains or otherwise. I would have it understood that I desire to claim, broadly, the rotation of the series of molds before the operator when automatically opened and closed. Furthermore, while I prefer to operate the plungers automatically by suitable means, it is evident that by giving an intermittent motion to the frame or molds as they are rotated each of the plungers in succession may be operated by hand, or one plunger may be made to answer for several molds. I desire to have it understood that I contemplate this also as coming within the scope of my invention in connection with a series of rotating molds.

What I claim is—

1. The combination, with a revolving frame, of a series of disconnected sectional molds, each mold opening and closing independently of the others, and a series of reciprocating plungers entering into and receding from said molds, substantially as described.

2. The combination, with a revolving frame, of a series of automatically opening and closing molds, and a series of automatically-reciprocating plungers entering into and receding from said molds, substantially as described.

3. The combination of a driving-shaft provided with a driving-pinion, a revolving frame provided with a gear meshing with said pinion, a series of disconnected sectional molds supported on said frame, and a series of reciprocating plungers entering into and receding from said molds, substantially as described.

4. The combination of a supporting-post, B, a revolving frame mounted upon said post, anti-friction rollers supporting the periphery of said frame, a series of automatically opening and closing molds carried by said frame, and a series of automatically-reciprocating plungers entering into and receding from said molds, substantially as described.

5. The combination of a revolving frame, a series of automatically opening and closing molds carried by said frame, and a series of plungers entering said molds and provided with a gear meshing with a stationary segmental gear for reciprocating said plungers, substantially as and for the purpose described.

6. The combination, with a revolving frame provided with a series of molds and a series of plungers adapted to be reciprocated therein, of the stationary elevated frame bearing a segmental gear, said plungers provided with a gear, R, adapted to engage therewith as the frame is revolved for reciprocating the plungers, substantially as described.

7. The combination, with a revolving frame provided with a series of molds, of the stationary elevated frame provided with two or more bars, H³ and H⁴, and molds connected with said frame by the toggle-levers I and I', the construction being such that as the frame is rotated the molds will be opened and closed, substantially as and in the manner described.

8. The combination, with a rotary frame provided with spokes L, arranged in parallel pairs, of a series of sliding molds supported by said spokes, toggle-arms I and I', connected with said molds, and in addition thereto an elevated stationary frame provided with two or more bars, H³ and H⁴, the construction being such that as the frame is rotated the molds will be opened and closed, substantially as and in the manner described.

9. The combination, with a revolving frame supporting a series of molds, of the toggle-arms I and I', connected therewith, one of said arms provided with a hook, i, and in connection therewith stationary bars H³ and H⁴, to engage with said toggle-arms to open and close the molds, substantially as and in the manner described.

10. A rotary frame provided with a driving-gear, J, and a series of spokes, L, a series of molds, and a series of reciprocating plungers, said gear and spokes provided with the removable plates L² and J², substantially as described.

11. In a machine for molding glass, a series of automatically opening and closing molds arranged to be moved one after another in succession, substantially as described.

12. In a machine for molding glass, the combination, with a series of molds, of an automatically-reciprocated plunger entering said molds, substantially as described.

13. The combination, with a series of moving molds automatically opening and closing, of a series of plungers automatically reciprocated in said molds, substantially as described.

In testimony whereof I sign this specification in the presence of two witnesses.

EMIL F. KRELL.

Witnesses:
N. S. WRIGHT,
M. B. O'DOGHERTY.